United States Patent [19]

York

[11] 4,325,543

[45] Apr. 20, 1982

[54] SAW BUCK

[76] Inventor: Floyd R. York, North Rd., Yarmouth, Me. 04096

[21] Appl. No.: 161,697

[22] Filed: Jun. 23, 1980

[51] Int. Cl.$^{3}$ .............................................. B23Q 3/00

[52] U.S. Cl. .................................... 269/295; 269/296; 83/762

[58] Field of Search .................................. 83/761-763, 83/467, 451, 796; 269/288, 289 R, 290-296, 54.3; 182/179, 181

[56] References Cited

U.S. PATENT DOCUMENTS 1,366,658 1/1921 Hopkinson ......................... 269/54.3
1,764,235 6/1930 Wilmking ............................. 83/762
1,798,551 3/1931 Mocking et al. .................... 269/291
3,623,517 11/1971 Neumann ............................. 83/796
3,832,928 9/1974 Copeland ............................. 83/467

FOREIGN PATENT DOCUMENTS 179015 8/1935 Switzerland ........................ 269/292

*Primary Examiner*—Robert C. Watson

[57] ABSTRACT

A saw buck has a series of holders interconnected in a predetermined spaced apart relation by side members, each connected to the appropriate side of each holder below the position in which the wood to be cut is supported by the holders. At least one pair of holders between the ends of the saw buck are closely spaced to provide transversely aligned slots to receive freely the bar and chain of a chain saw and spaced from adjacent holders the distance representing the wanted lengths into which the wood is to be cut. The arrangement of the holders is such that the cut pieces remain held by the saw buck.

5 Claims, 3 Drawing Figures

SAW BUCK

BACKGROUND REFERENCES

U.S. Pat. No. 521,317;
U.S. Pat. No. 2,518,801;
U.S. Pat. No. 3,171,453.

BACKGROUND OF THE INVENTION

At the present time, it is a common practice either to harvest cord wood or to purchase such wood which must then be cut into lengths appropriate for a stove, heater, or both.

In order that cord wood can be sawed into wanted lengths with maximum ease and convenience, a saw buck is necessary that will hold a log or a split section thereof while being cut into the wanted shorter lengths. An early type of saw buck consisted of a half log disposed flat side down and provided with upwardly disposed members that not only held a length of cord wood and the sections into which it was cut but also provided guides as to where each cut was to be made.

I am aware that another type of saw buck holds each length of cord wood by one end so that it is supported as a cantilever.

THE PRESENT INVENTION

The general objective of the present invention is to provide a saw buck of the first referred-to type but that will support a length or lengths of wood at a level in which sawing may be conveniently and safely effected and that is adapted for commercial production.

In accordance with the invention, that objective is attained with a saw buck utilizing holders interconnected in a predetermined spaced apart relationship by side members below the position in which the wood to be cut is supported by the holders, the spacing of the holders depending on the lengths into which the wood is to be cut and the number of cuts necessary for that purpose. It is preferred that the holders are H-shaped. The spacing requires that for each cut that is to be made there be provided a pair of holders so closely spaced as to establish vertically aligned slots dimensioned to so freely receive the chain and bar of a chain saw that the resulting cut lengths will be substantially uniform without the likelihood of the holders being contacted and damaged by the chain. The spacing of the holders is such that the cut wood remain held by the saw buck.

Another objective of the invention is to enable not only a log of a predetermined maximum diameter to be held but also to enable several lengths of wood of a small diameter such as limb wood, to be safely and easily sawed, an objective attained by providing a sand bag that may be laid across several such lengths between adjacent holders that determine the lengths into which the wood is to be cut.

BRIEF DESCRIPTION OF THE DRAWINGS

The accompanying drawings illustrate a preferred embodiment of the invention of which.

THE PREFERRED EMBODIMENT OF THE INVENTION

Figure 1:
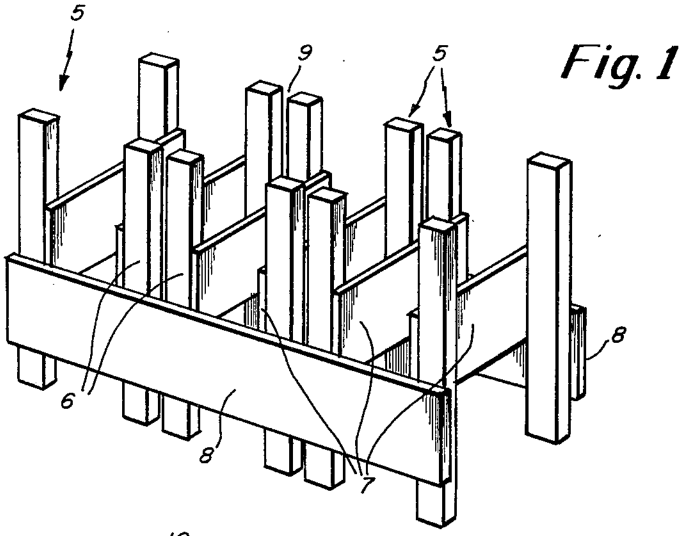
FIG. 1 is a perspective view of a saw buck in accordance with the invention.

The saw buck illustrated by the drawings consists of H-shaped holders generally indicated at 5 each of which consists of uprights 6 interconnected between their ends by an end board 7 fastened to the uprights 6 at one side thereof. The supports 5 are interconnected in a predetermined spaced apart relationship by side boards 8 secured to the uprights 6 with the upper edges of the side boards 8 well below the upper edges of the end boards 7 with a single upright 6 at each end of the saw buck and with intermediate holders 5 arranged in closed spaced pairs. Each such pair of holders provides a transversely aligned slot 9 dimensioned freely to receive the bar and chain of a chain saw generally indicated at 10 in FIGS. 2 and 3. There is one such pair of holders for each cut to be made and its spacing relative to an adjacent end holder or an adjacent pair thereof determines the length into which wood may be cut.

In more detail, the uprights 6 are, in practice, two inch by three inch stock, preferably spruce, and a satisfactory length is thirty-two inches, and the end and side members are pine boards of appropriate length and desirably eight to ten inches in width. The end boards 7 are so located that wood resting thereon is held at a convenient level, say twenty inches above the ground, and spaced well above the side boards 8 so that in sawing wood, contact of the chain therewith is easily avoided. The uprights 6 extend sufficiently above the end boards 7 and the end boards 7 are of a length such that each holder 5 has an upwardly opening log receiver 11 dimensioned to accommodate a log of a predetermined maximum size, one of a one foot diameter by way of example and not of limitation. The uprights 6 extend below the side boards to provide legs.

As a saw buck in accordance with the invention is usually for use in cutting cord wood into either one foot or eighteen inch lengths, the side boards 8 are four feet in length in order that cut sections will not fall to the ground but will remain held by the saw buck. If a thus dimensioned saw buck is used with longer wood, ends thereof extending beyond the ends of the saw buck will, of course, fall to the ground but such longer wood is so securely held that it may be easily and safely cut.

In the disclosed embodiment of the invention, there are two intermediate pairs of holders 5 as cord wood is to be cut into eighteen inch lengths. There would be three intermediate pairs of holders 5 if cord wood is to be cut into one foot lengths and it is not essential that the spacing between the pairs of uprights be equal as it might be desired, for example, to cut four foot lengths into two eighteen inch lengths and one twelve inch length.

Figure 2:
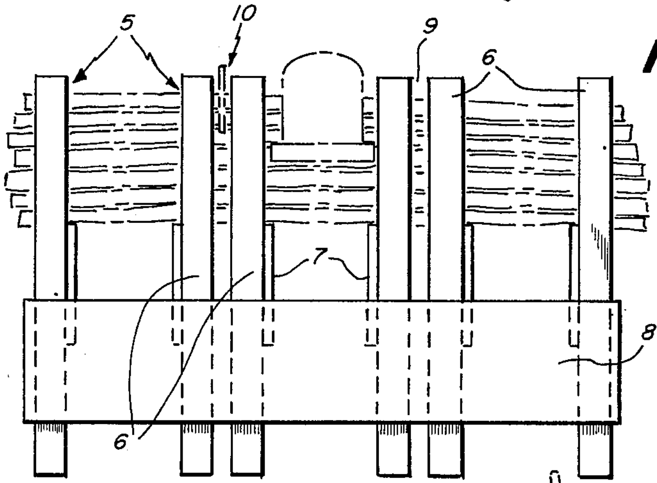
FIG. 2 is a side view of the saw buck illustrating its use in cutting small diameter wood into wanted lengths.
Figure 3:
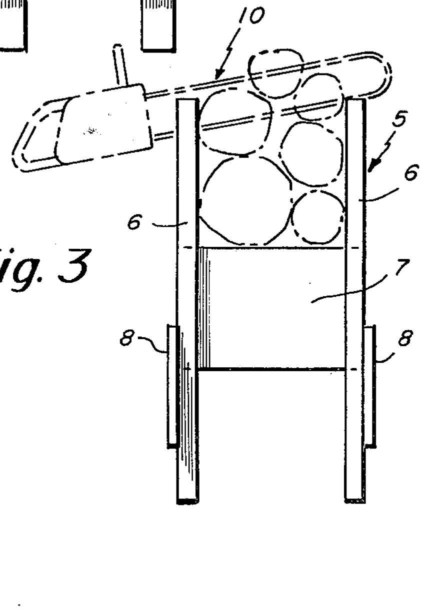
FIG. 3 is an end view of the saw buck illustrating its use in cutting larger wood into wanted lengths.

While the saw buck has been described as for use in cutting cord wood, saw bucks in accordance with the invention may of course be made for use with longer or shorter wood with the number and spacing of the holders such that any specified wanted cut lengths are provided for.

Where small diameter wood such as limb wood is to be cut, several lengths, see FIG. 2, may be supported in the receivers 11 established by the holders of the saw buck. Cutting such wood safely requires that they be held against being pulled by the chain. A sand bag 12 is provided to prevent such movement and is dimensioned to lay across the space between adjacent pairs of holders 5 that establish a wanted wood length. The use of the sand bag is not necessary with wood of larger sizes such as those shown in FIG. 3.

I claim:

1. A wooden saw buck said saw buck including a series of H-shaped holders for use in sawing with a chain saw lengths of logs, split sections of logs or limbs, each holder consisting of a pair of straight uprights and a straight transverse supporting member connected approximately at right angles to said upright, the lower ends of said uprights the legs of the saw buck and their upper ends confining wood lengths when supported by said transverse members, and connecting members, one for each of the corresponding uprights of the supports and connected thereto below the upper edges of said transverse members and above the lower ends of said uprights and spacing said supports from each other in a manner depending on the wanted lengths into which said wood lengths are to be cut and the number of cuts necessary for such wanted lengths, said spacing such that for each cut that is to be made there is a pair of holders so closely spaced as to establish transversely aligned slots of a width such as to freely receive the chain and bar of a chain saw, with the upper edges of said connecting members below the upper edges of the transverse members, the distance between the upper edges of the transverse supporting members and of the connecting members such that the connecting members are so far below wood lengths held in the saw buck that the user of the chain saw can readily control the use thereof to prevent contact of the chain with either connecting member.

2. The wooden saw buck of claim 1 and a sand bag the width of which is such that it is a free fit between any two holders establishing the wanted wood lengths and the length of which is enough greater than the distance between the connecting members thus to be able to overlie a plurality of such lengths of wood of small cross sectional dimensions such as limb wood.

3. The wooden saw buck of claim 1 in which the connecting members and transverse members are boards and the upper edges of the connecting members are above the lower edges of the transverse members.

4. The saw buck of claim 1 in which there is a single holder at each end of the saw buck.

5. The saw buck of claim 4 in which there are a plurality of pairs of holders between said end holders.

* * * * *